US006944614B1

(12) United States Patent
Ramasamy et al.

(10) Patent No.: US 6,944,614 B1
(45) Date of Patent: Sep. 13, 2005

(54) QUERY MONITOR PLAYBACK MECHANISM FOR POST-MORTEM PERFORMANCE ANALYSIS

(75) Inventors: Karthikeyan Ramasamy, Madison, WI (US); Jie-Bing Yu, Carlsbad, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/449,085

(22) Filed: Nov. 24, 1999

(51) Int. Cl.⁷ .............................................. G06F 7/00
(52) U.S. Cl. ...................................................... 707/4
(58) Field of Search ................................ 707/1, 3–5, 8, 707/10, 100–104.1, 200–202, 205, 206; 702/127, 182–187; 714/1, 25, 37–39, 45–47, 100

(56) References Cited

U.S. PATENT DOCUMENTS

| | | | | |
|---|---|---|---|---|
| 4,772,966 A | * | 9/1988 | Sharples et al. | 360/13 |
| 5,613,113 A | * | 3/1997 | Goldring | 705/38 |
| 5,625,815 A | * | 4/1997 | Maier et al. | 707/8 |
| 5,726,913 A | * | 3/1998 | Grimsrud | 702/186 |
| 5,857,180 A | * | 1/1999 | Hallmark et al. | 707/2 |
| 5,926,813 A | * | 7/1999 | Chaudhuri et al. | 707/1 |
| 5,978,928 A | * | 11/1999 | Rust | 702/187 |
| 6,021,434 A | * | 2/2000 | Pizano | 358/403 |
| 6,185,575 B1 | * | 2/2001 | Orcutt | 707/200 |
| 6,243,702 B1 | * | 6/2001 | Bamford et al. | 707/10 |
| 6,282,701 B1 | * | 8/2001 | Wygodny et al. | 702/183 |

OTHER PUBLICATIONS

"Opt++: An Object–Oriented Design for Extensible Database Query Optimization" with David DeWitt, The VLDB Journal, vol. 8, Issue 1, Jan. 1999.

* cited by examiner

Primary Examiner—Greta Robinson
Assistant Examiner—Harold E. Dodds, Jr.
(74) Attorney, Agent, or Firm—Gates & Cooper LLP

(57) ABSTRACT

A method, apparatus, article of manufacture, and a memory structure for monitoring an executed query comprising at least one execution thread is disclosed. The method comprises the steps of executing the query; and while executing the query, storing an execution trace record for each execution thread in at least one execution log file. The execution trace record comprises execution trace information including a thread ID and a time stamp for the execution thread. The execution trace information can be recalled from the execution log file and presented to a user after execution of the query to allow post mortem analysis of the query. The article of manufacture comprises a program storage device tangibly embodying instructions for performing the method steps described above. The apparatus comprises a data server for executing the execution thread and for storing an execution trace record for the executed execution thread, the execution trace record having execution trace information including a thread identifier and a time stamp; a query coordinator for storing an execution plan having a time stamp and for retrieving and synchronizing the execution trace record and the execution plan; and a client process for displaying the retrieved execution trace information to a user after execution of the query.

36 Claims, 9 Drawing Sheets

FIG. 3A
```
SELECT * FROM EMP.DEPT
WHERE   EMP.DNO = DEPT.DNO
AND     EMP.NAME = "LEE"
```
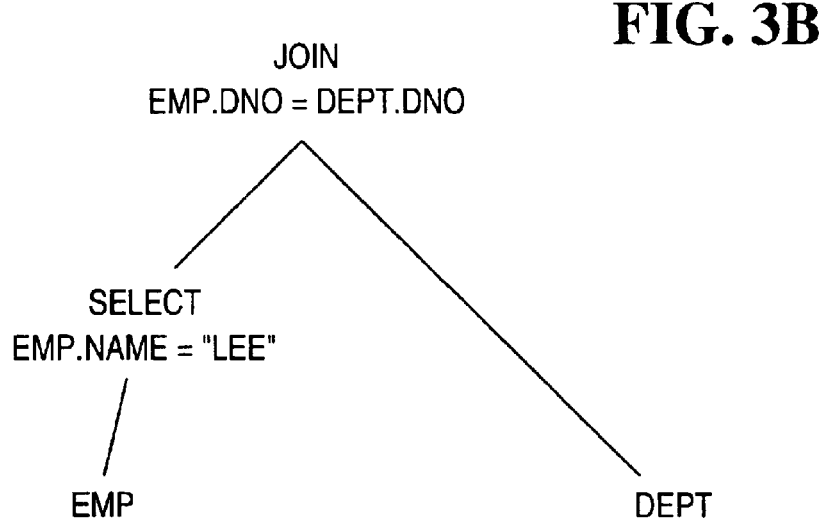
FIG. 3B
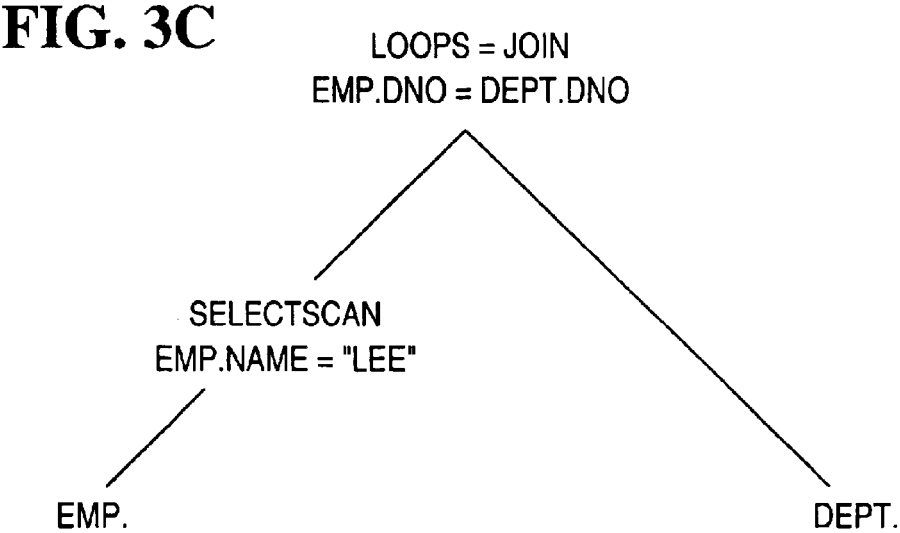
FIG. 3C

US 6,944,614 B1

QUERY MONITOR PLAYBACK MECHANISM FOR POST-MORTEM PERFORMANCE ANALYSIS

CROSS REFERENCE TO RELATED APPLICATIONS

This application is related to the following and commonly assigned patent application, which is incorporated by reference herein:

Application Ser. No. 09/444,704 now U.S. Pat. No. 6,601,064 entitled "METHOD AND APPARATUS FOR FETCHING ARRAY BASED OBJECTS BY DIRECT DELIVERY AND BATCHING" filed on same date herewith, by Zhe Wang, Biswadeep Nag, Jie-Bing Yu, and Jignesh M. Patel.

BACKGROUND OF THE INVENTION

1. Field of the Invention

The present invention relates to systems and methods for performing queries on data stored in a database, and in particular to a method and system for monitoring and reconstructing the execution of a database query.

2. Description of the Related Art

Large-scale integrated database management systems provide an efficient, consistent, and secure means for storing and retrieving vast amounts of data. This ability to manage massive amounts of information has become a virtual necessity in business today.

At the same time, wider varieties of data are available for storage and retrieval. In particular, multimedia applications are being introduced and deployed for a wide range of business and entertainment purposes, including multimedia storage, retrieval, and content analysis. Properly managed, multimedia information technology can be used to solve a wide variety of business problems.

Database management systems typically include a query monitoring utility that provides real-time monitoring of the execution of database queries. However, real-time query monitoring often does not allow field support engineers or database administrators (DBAs) to monitor and analyze all running queries, especially for those which must be analyzed after the query is completed (post-mortem analysis). What is needed is a system and method that allows query execution to be recorded for playback after query execution. The present invention satisfies that need.

SUMMARY OF THE INVENTION

To address the requirements described above, the present invention discloses a method, apparatus, article of manufacture, and a memory structure for monitoring an executed query comprising at least one execution thread.

The method comprises the steps of executing the query; and while executing the query, storing an execution trace record for each execution thread in at least one execution log file. The execution trace record comprises execution trace information including a thread ID and a time stamp for the execution thread. The execution trace information can be recalled from the execution log file and presented to a user after execution of the query to allow post mortem analysis of the query. The article of manufacture comprises a program storage device tangibly embodying instructions for performing the method steps described above.

The apparatus comprises a data server for executing the execution thread and for storing an execution trace record for the executed execution thread, the execution trace record having execution trace information including a thread identifier and a time stamp; a query coordinator, for storing an execution plan having a time stamp and for retrieving and synchronizing the execution trace record and the execution plan; and a client process for displaying the retrieved execution trace information to a user after execution of the query.

The foregoing playback mechanism can record all of the action in the persistent files used by the execution threads of the database query, and allow a query monitor to play back the requested execution operations in a user-specified manner. The playback mechanism can also support passing, fast-forward operations, fast backward operations, or display results and progress at any desired speed.

BRIEF DESCRIPTION OF THE DRAWINGS

Referring now to the drawings in which like reference numbers represent corresponding parts throughout;

FIGS. 3A–3C present an example of an SQL query, an associated tree of rational operators, and an associated access plan;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
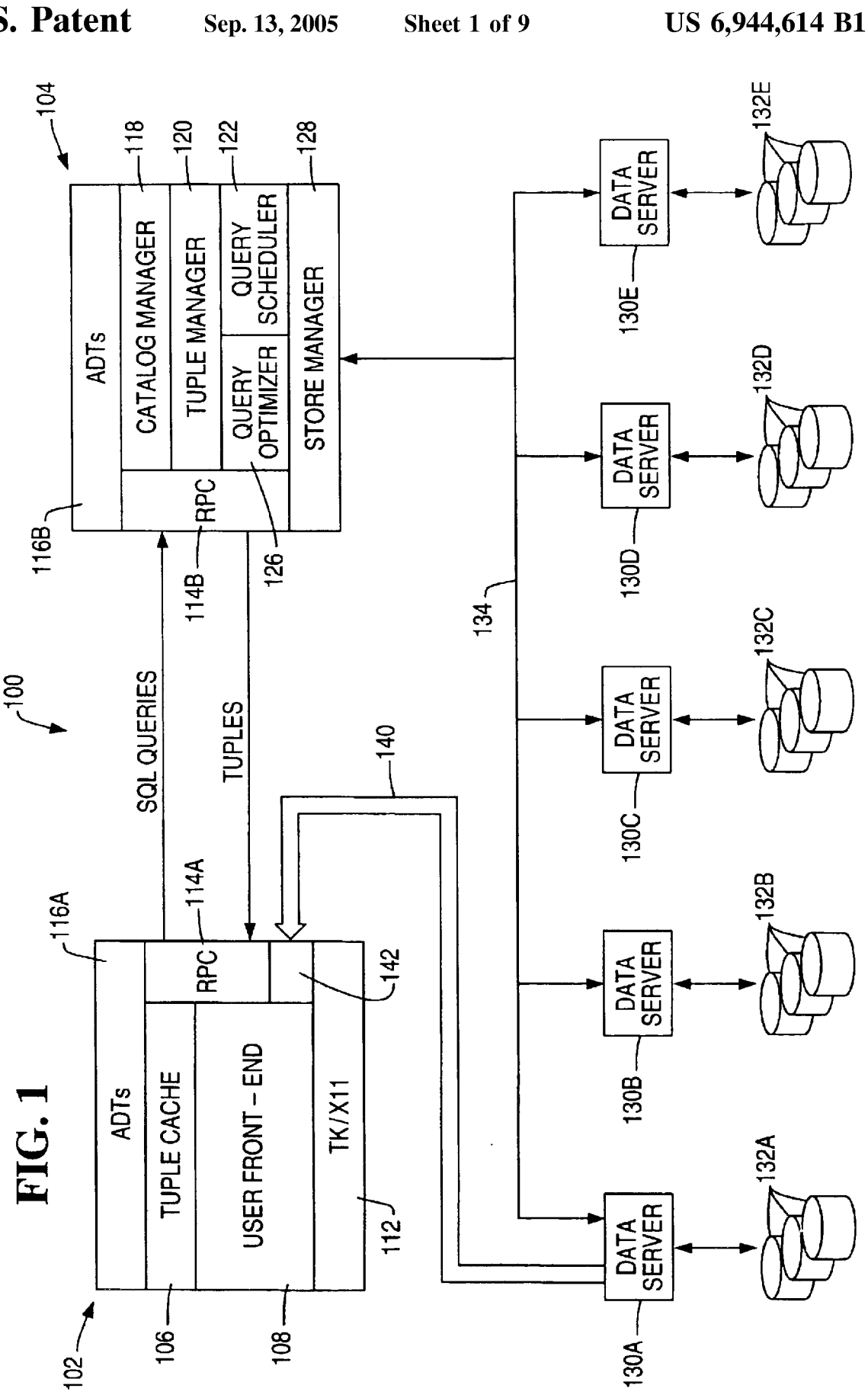
FIG. 1 is a block diagram showing an exemplary environment for practicing the present invention.

FIG. 1 is a diagram showing an exemplary environment in which the present invention may be practiced. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132). The data servers 130 also perform portions of the execution plan in execution threads as determined by the query coordinator to execute the query. The query coordinator 104 and data servers 130 may be implemented in separate machines, or may be implemented as separate or related processes in a single machine. The QC 104 and the DS 130 communicate via a communication infrastructure 134 which can automatically select the most efficient mechanism for the transport of data between the QC 104 and any one of the DS 130 elements. When a message is between processes or entities that do not share a common memory system, a transport protocol such as transmission control protocol (TCP) or message passing interface (MIP) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 104 to submit a query. After parsing and optimization, the QC 104 generates an execution plan for the query and transmits portions of the plan to the appropriate data servers 130A–130E for execution. Hence, the QC 104 controls the parallel execution of the query on the DS 130 processes. Query results including result sets are collected by the QC 104 for delivery back to the client process 102.

The QC 104 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, and select) takes its input from an input stream and places its result tuples on an output stream. The streams themselves are C++ objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same of different processors, network streams also provide a flow-control mechanism that is used to regulate the execution rates of the different operators in the pipeline. Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 104), which is used to control the parallel execution of the query, instantiates the correct type of stream objects to connect the operators.

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase function with the definition of each aggregate.

The query coordinator 104 also comprises a tuple manager 120, a catalog manager 118, a query optimizer 126, a query scheduler 122, and a storage manager 128. The tuple manager 120 receives the tuples from the data servers 130, formats and processes the tuples, and passes them along to the client program or process 102. The catalog manager 118 manages metadata regarding the tables and types in the database. The query optimizer generates an execution for queries received from the client process 102.

The client program 102 comprises a front end 108, which provides a graphical user interface that supports querying, browsing, and updating of database objects through either its graphical or textual user interfaces. In either case, the front end transforms a query into an extended SQL syntax and transmits it to the query coordinator 104 for execution. After executing the query, the query coordinator 104 transmits the results back to the client program 102 in the form of a set of tuples which can be iterated over using a cursor mechanism. In one embodiment, all communications between the front end 108 and the processes implemented in the query coordinator 104 are in the form of remote procedure calls 114A and 114B implemented over a Transmission Control Protocol/Internet Protocol (TCP/IP). The client process 102 also comprises a tuple cache 106 for retaining tuples received from the query coordinator 104. ADTs 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population >300 K) in one layer on top of a second layer of country objects.

The client front end 108 also allows the user to query through a graphical interface; implicitly issuing spatial queries by zooming, clicking, or sketching a rubber-banded box on the 2-D map. The graphical capabilities of the client can be implemented using toolkits such as Tk/X11. Further, the user can query by explicitly composing ad-hoc queries in the database system's 100 extened SQL syntax.

The user can use the client front end 108 to browse the objects from a table. In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. This data is received by the direct data transfer module 142 in the client 102.

Figure 2:
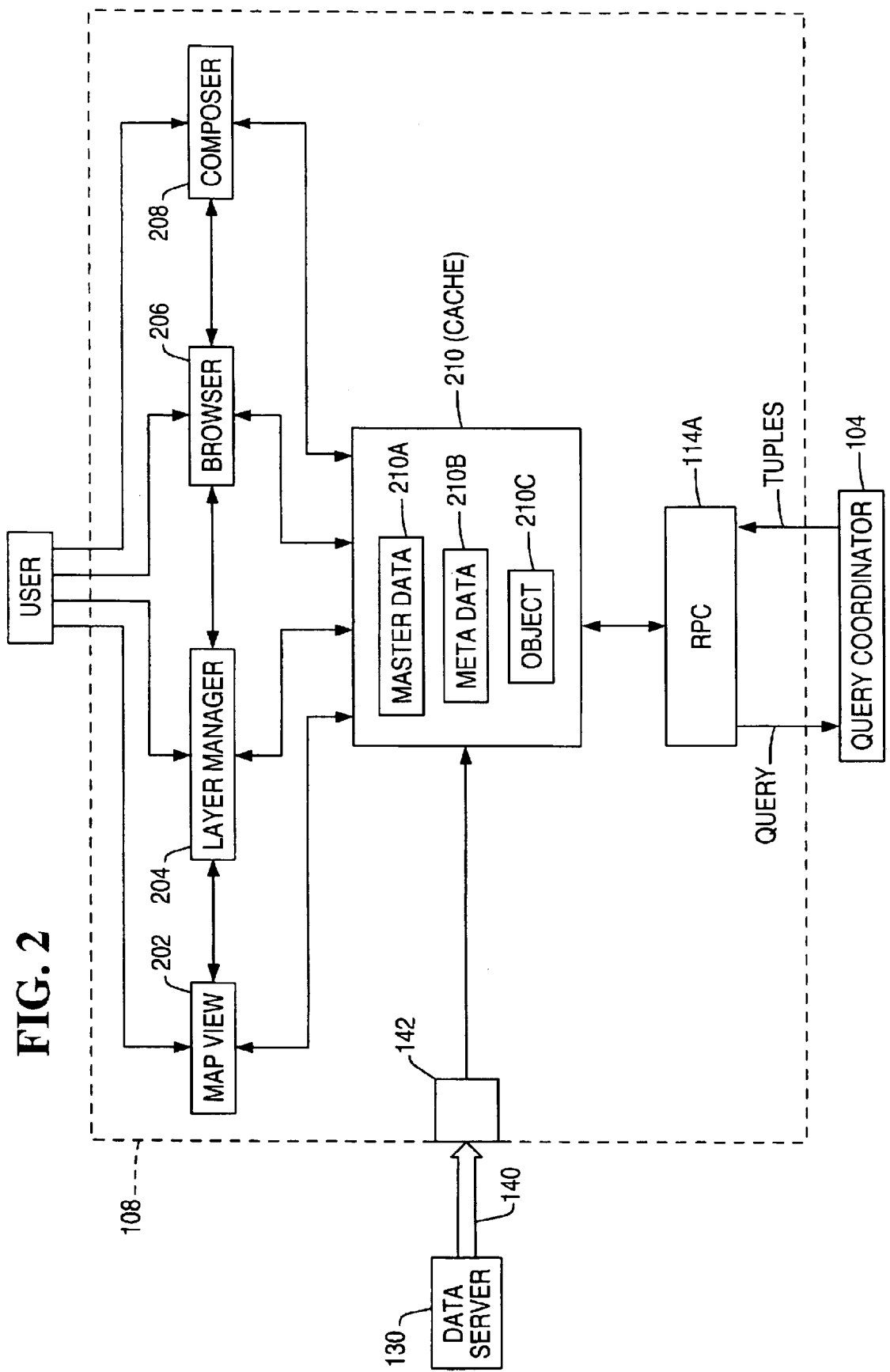
FIG. 2 is a diagram showing one embodiment of the user front end of the exemplary hardware environment depicted in FIG. 1.

FIG. 2 is a diagram showing one embodiment of the user front end of the exemplary environment depicted in FIG. 1. The client front end 108 comprises a map view 202, layer manager 204, browser 206 and a query composer 208. The map view 202 is responsible for displaying and manipulating objects contained in one or more layers. The current position of the cursor is continuously displayed in a sub-window in units of the map projection system. Users can point and click on displayed objects to view their non-spatial attributes. The layer manager 204 is responsible for adding, deleting, hiding, and reordering layers displayed by the map view 202. Each layer corresponds to a table of objects produced by executing some query. The extent browser 206 allows a user to view any database table and adjust the way it should be displayed by the map view 202. The selected table becomes a new layer with its spatial attributes displayable via the map view 202.

The query composer 208 allows a user to compose a SQL query using a simple text editor. The RPC 114 is the interface to the query coordinator 104. It ships SQL queries to the query coordinator 104 for execution and retrieves result tuples into the cache 210. The cache 210 comprises a master data cache 210A, a metadata cache 210B and an object cache 210C. The object cache 210C caches the result of a query in formats understood by the map view 202. The metadata cache 210 stores the catalog information of the currently open database. The master data cache 210A stores retrieved master data as described further below. In one embodiment, the object cache 210C also caches the objects downloaded from the data servers 130. FIG. 2 also shows the second communication path 140 from the data server 130 to the user front end 108 via the direct data transfer module 142.

Array-based abstract data types can be used as basis for a number of useful data types, including BLOBs, CLOBs, video, audio, text, image, maps and other large objects. Array-based ADT use an external out-of-line storage for very large objects.

Queries can be logically represented as an operator tree. An operator tree is a tree in which each node represents a logical query algebra operator being applied to its inputs.

FIGS. 3A, 3B, and 3C present an example SQL query, an associated tree of rational operators, and an associated access plan. A given query can be represented by one or more equivalent operator trees.

One or more physical execution algorithms can be used in a database for implementing a given query algebra operator. For instance, the join operator can be implemented using nested-loops or sort-merge algorithms. Replacing the operators in an operator tree by the algorithms used to implement them gives rise to a "tree of algorithms" known as an access plan or an execution plan. FIG. 3C shows one possible access plan corresponding to the operator tree in FIG. 3B. Each operator tree will, in general, have a number of corresponding access plans.

During the query optimization process, a query optimizer 126 must generate various operator trees that represent the input query (or parts of it), generate various access plans corresponding to each operator tree, and compute/estimate various properties of the operator trees and access plans (for example, cardinality of the output relation, estimated execution cost, etc.). This is implemented in OPT++ in a query-algebra-independent manner.

Figure 4:
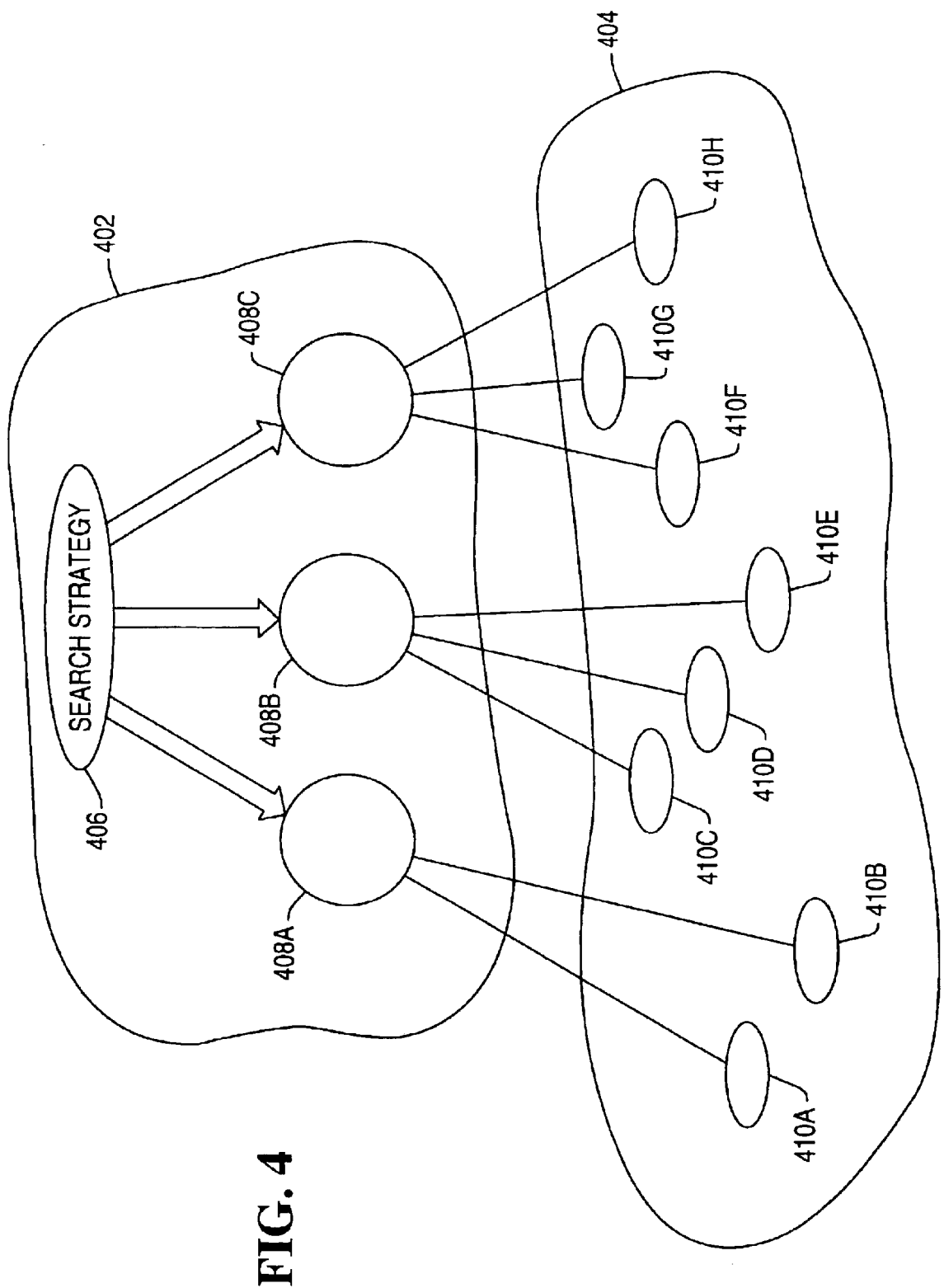
FIG. 4 is a diagram depicting an overview of a class structure architecture that can be used with the present invention.

FIG. 4 is a diagram depicting an overview of the OPT++ architecture. A key feature of OPT++ is that a few abstract classes and their virtual methods are defined a priori and the search strategy is written entirely in terms of these classes. OPT++ uses abstract classes to represent operator trees and access plans and compute their properties. OPT++ uses abstract classes to generate and manipulate different operator trees and their corresponding access plans.

The foregoing abstract classes include the OPERATOR and ALGORITHM abstract classes. These classes are used to represent operator trees and access plans, and for computing their properties.

Figure 5:
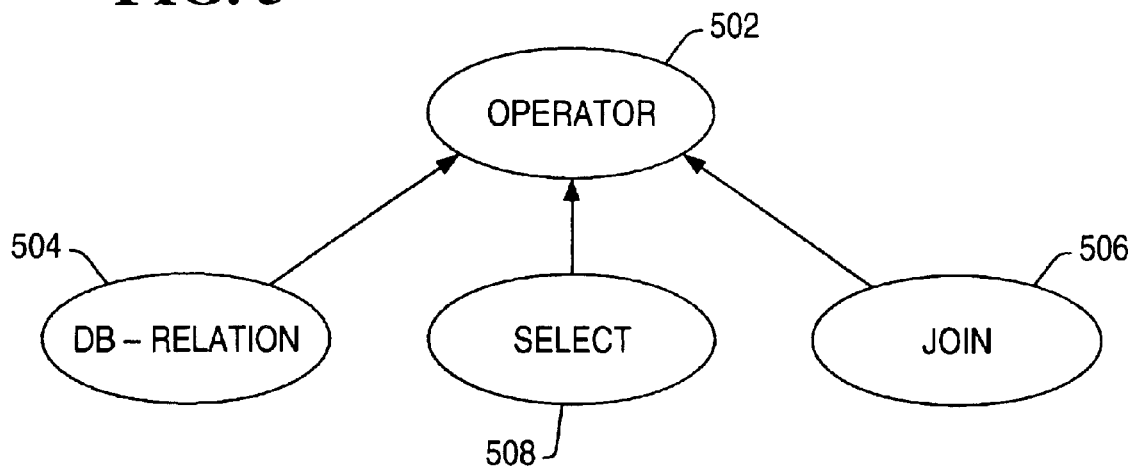
FIG. 5 is a diagram showing an operator class hierarchy for a relational optimizer.

FIG. 5 is a diagram showing the operator class hierarchy for a relational optimizer such as the query optimizer 126. In FIG. 5, classes are represented by oval shapes, and an arrow between classes indicates an inheritance relationship. As shown in FIG. 5, operators, inherit characteristics from, for example, database relations 504, select class 508, and join class 506.

The abstract OPERATOR class represents operators in the query algebra. From the OPERATOR class an optimizer implementor (OI) such as the query optimizer 126 is expected to derive one class for each operator in the actual query algebra. An instance of one of these derived operator classes represents the application of the corresponding query language operator. As an example, the classes that an OI might derive from the OPERATOR class to implement a simple SQL optimizer are shown in FIG. 3. The SELECT and JOIN classes (508 and 506, respectively) represent the relational select and the relational join operators respectively. The DB-RELATION operator 504 is explained below. In this SQL optimizer, an instance of the SELECT operator 508 represents an application of the relational select operator to one input relation, and an instance of the JOIN operator 506 represents an application of the relational join operator to two input relations. The inputs of an operator can either be database entities (for example, relations for a relational database) that already exist in the database, or they can be the result of the application of other operators. An operator tree can thus be represented as a tree of instances of the operator class (more accurately, an instance of a class derived from the abstract OPERATOR class).

Dummy operators serve as leaf nodes of the operator tree, representing database entities that already exist in the database. For example, the relations in the "from" clause of an SQL query are represented by the dummy DB-RELATION operator in the illustrations that follow.

Figure 6:
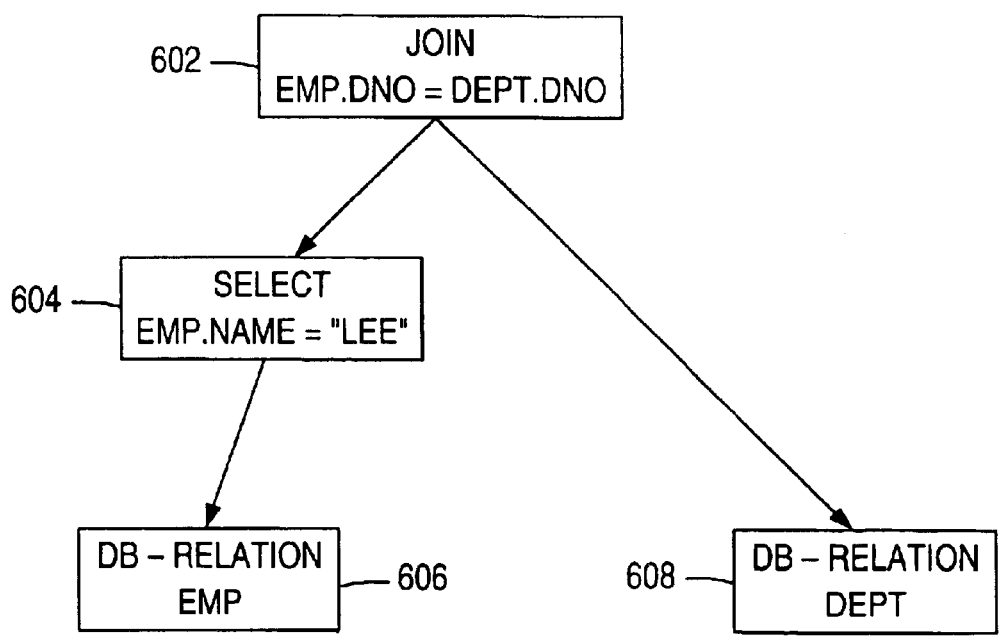
FIG. 6 is a diagram showing an example of an operator tree corresponding to the query shown in FIG. 3A.

FIG. 6 is a diagram showing an example of an operator tree corresponding to the query shown in FIG. 3A. The two instances of the DB-RELATION class (instance 608 and instance 606) represent the two relations in the from clause of the query— "Emp" and "Dept."0 The instance of the SELECT class 604 represents a selection on the "Emp" relation, and the instance of the JOIN class 602 represents the "Dept" relation being joined to the result of the selection.

Figure 7:
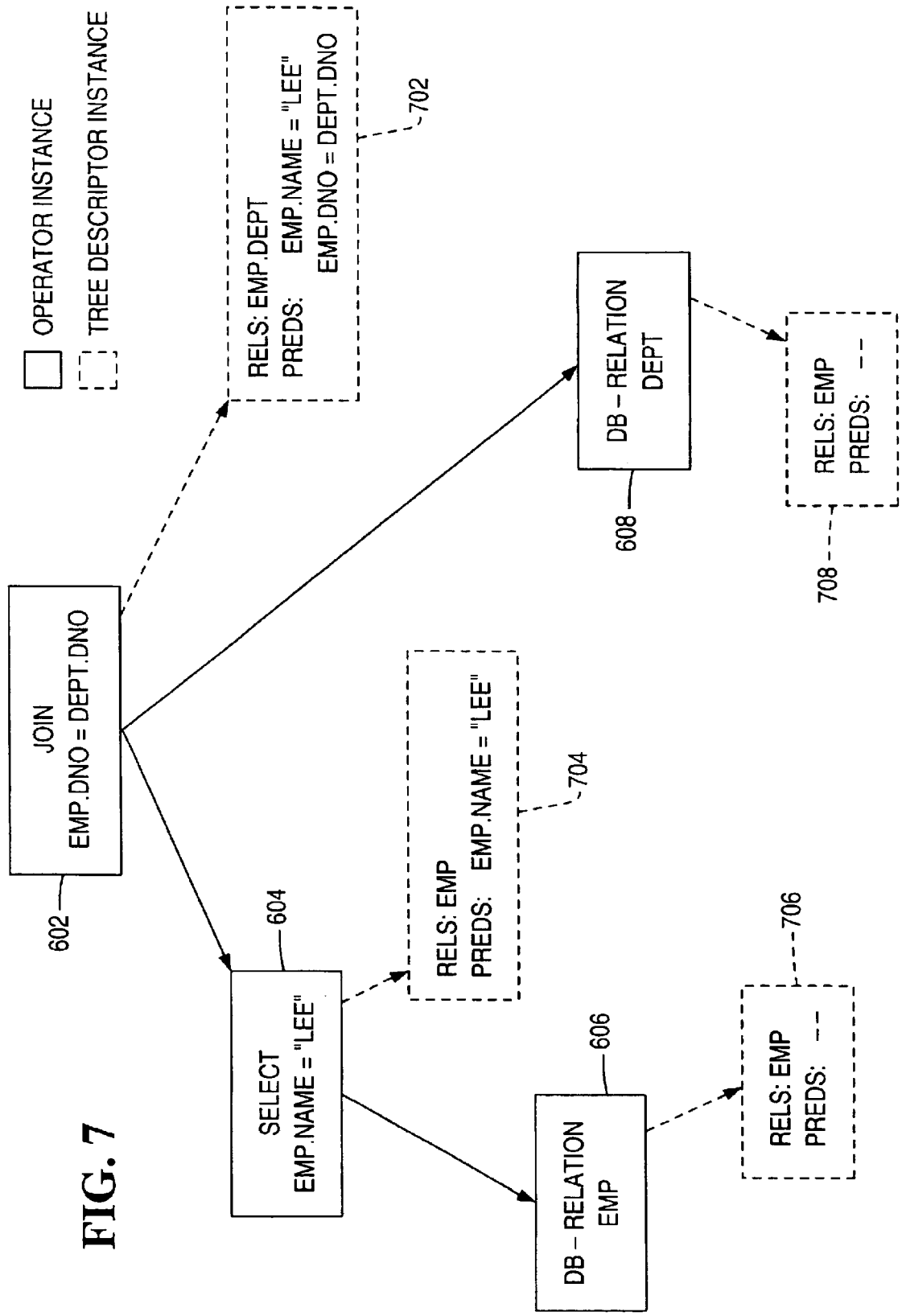
FIG. 7 is a diagram presenting an example of the operator tree depicted in FIG. 6 illustrating the associated tree descriptors.

FIG. 7 is a diagram presenting an example of the operator tree depicted in FIG. 6 illustrating its associated tree descriptors 702–708. During the course of optimization, the optimizer needs to compute and keep track of the properties of the resultant output of an operator tree. For example, a simple relational optimizer needs to estimate properties such as the cardinality, or the size of the relation resulting from the execution of an operator tree. Since such information depends upon the query algebra, OPT++ has to rely on the OI to provide these properties. To do this, the OI is expected to define a TREEDESCRIPTOR class that stores information about an operator tree. The information stored could be logical algebraic properties (e.g., set of relations already joined in, predicates applied), estimated properties (e.g., number of tuples in output) or any other information of interest to the OI.

In FIGS. 3–7, classes are depicted as ovals and instances are depicted as boxes. Thus classes hierarchies are depicted using ovals, while operator trees and access plans will be drawn using boxes. Every operator instance contains a pointer to an instance of the TREEDESCRIPTOR class, that stores information about the operator tree rooted at that operator instance. FIG. 7 reproduces the operator tree of FIG. 6 showing the TREEDESCRIPTOR instances associated with each operator instance. In this example, each TREEDESCRIPTOR instance lists the names of the relations that have been joined in and the predicates applied.

With the TREEDESCRIPTOR class the OI must provide an IsEquivalent method that determines whether two TREEDESCRIPTOR instances are equivalent. Two TREEDESCRIPTOR instances should be equivalent if the corresponding operator trees are algebraically equivalent. The TREEDESCRIPTOR also has an IsCompletelyQuery method that determines whether the corresponding operator tree represents the whole query or just a sub-computation.

The OPERATOR class includes a virtual method called DERIVETREEDESCRIPTOR. This method is invoked on an operator instance to construct the TREEDESCRIPTOR object for the operator tree rooted at that operator instance, given the TREEDESCRIPTOR instances of its input operators. The OPERATOR class has another virtual method called CANBEAPPLIED that determines whether that operator can be legally applied to given inputs according to the rules of the query algebra.

Given an operator tree, the search strategy can compute the TREEDESCRIPTOR for it by invoking the DERIVETREEDESCRIPTOR method on each of the operator instances in the tree. Note that the search strategy just invokes the methods on the abstract OPERATOR class and does not require any information about the actual class of each instance. Through runtime binding, the proper DERIVETREEDESCRIPTOR method is invoked and the correct TREEDESCRIPTOR computed. Thus the search strategy (which is implemented in terms of the abstract OPERATOR class) can compute the correct TREEDESCRIPTORs for an operator tree even though it has no knowledge of the actual operators in the query algebra. The IsCompletQuery, IsEquivalent and the CANBEAPPLIED methods can be used to analyze the generated operator trees.

Figure 8:
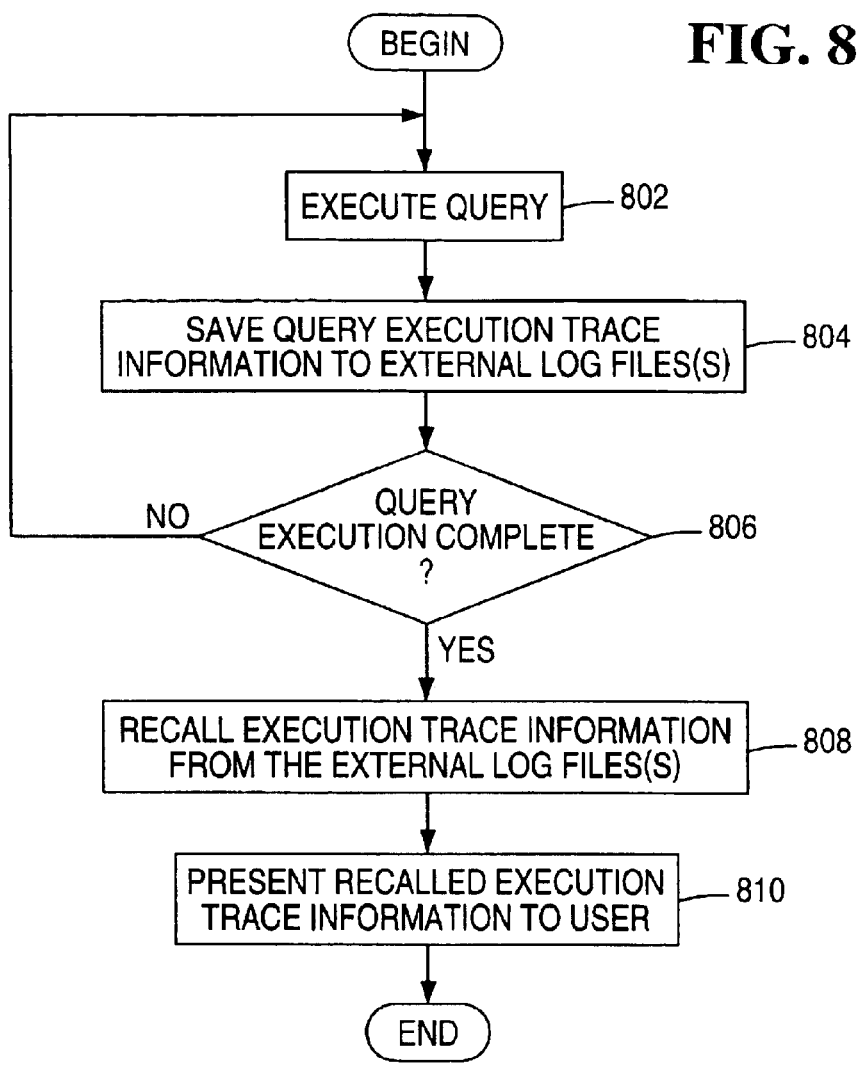
FIG. 8 is a flow chart depicting exemplary operations used to practice one embodiment of the present invention.

FIG. 8 is a flow chart depicting exemplary operations used to practice one embodiment of the present invention. When the query is executed, 802, query execution trace information for each execution thread is saved to an external log file, as shown in block 804. The execution trace information may also be sent directly to the query monitor as well, if directed by a suitable user command. In one embodiment, execution trace information is saved as a default operation, without user intervention. In an alternative embodiment, the information is not stored unless the user directs as such.

In one embodiment the query coordinator 122 and each data server 130 write the query execution trace information to a single log file, where it can be reconstructed when desired. In one embodiment, the query coordinator 104 and each data server 130 writes query execution trace information to a separate log file, and the information is later reconstructed when post-mortem analysis is desired. The execution trace information from the query coordinator 104 includes an execution plan in terms of the operator trees described herein, operator dispatch information, including operating nodes and device identifications, output data flow destinations, and the start and stop times for the operators. The execution trace information from the data servers includes the session ID, the query ID, and the following for each operator: the operator ID, each operator thread's start time stamp, each operator thread's processing tuple count, and each operator thread's finish time. If the operator thread's processing tuple count is excessively large (as may be experienced with long running transactions) it can be flushed out periodically.

Each execution trace record includes identity information including the thread ID and time stamp information. The time stamps may reference a clock time, or may be logical. The time stamps are loosely synchronized by periodic messages from the query coordinator 104. The relationship between logical time stamps to real time stamps can also be loosely established by the query coordinator 104 node by periodic trace entries that include a real time stamp and a logical time stamp. In cases where the execution trace records are written to different files, each file is uniquely names to reflect its identity.

The query execution trace file can be split into multiple partitions based upon the mount of trace information and the availability of local disk space for storage. The partitions can be reused if the amount of trace information exceeds the monitor window. Or the partitions can be flushed to permanent archiving storage devices like tape or hard disks for later retrieval of historical data. In this case time stamp information is encoded into the file name to facilitate retrieval and organization. Since the execution trace information is highly structured, schema can be defined in the information and loaded into an external data warehouse for further analysis purposes.

Returning to FIG. 8, after the query has completed execution 806, the execution trace information is recalled from the execution log file(s), as shown in block 808. Where the execution trace information is stored in multiple files, a query monitor implemented in either the client process 102 (preferably in the user front end 108 or in the query coordinator 104) gathers information by reading the execution trace information directly from the files saved by the query coordinator. These files can be saved in the query coordinator 104 or in the data storage devices 132 by the data server 130.

Figure 9:
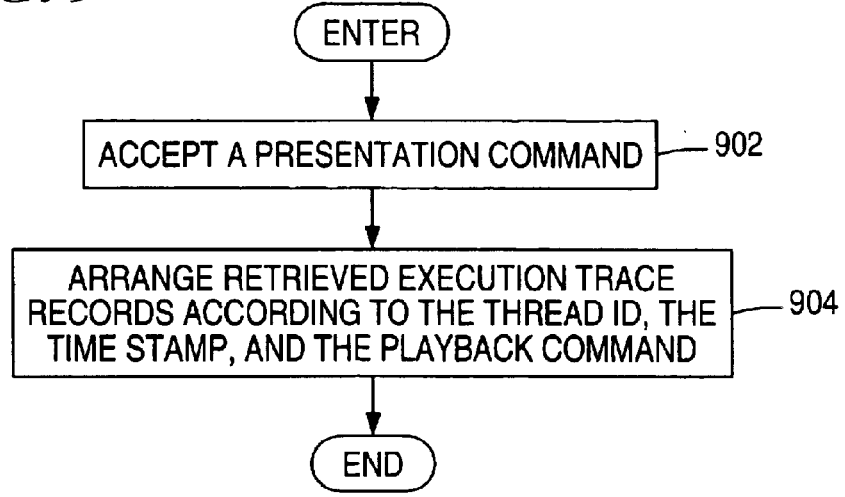
FIG. 9 is a flow chart presenting illustrating process steps used to present the recalled execution trace information to the user.

FIG. 9 is a flow chart presenting illustrative process steps used to present the recalled execution trace information to the user. First, a presentation command is accepted. The presentation command may include, for example, any combination video cassette recorder (VCR) type functions, including a play command, a stop command, a pause command, a reverse play command, a fast play command, and a fast reverse play command. The retrieved execution trace information is then arranged according to the thread ID, the time stamp, and the selected playback command.

Figure 10:
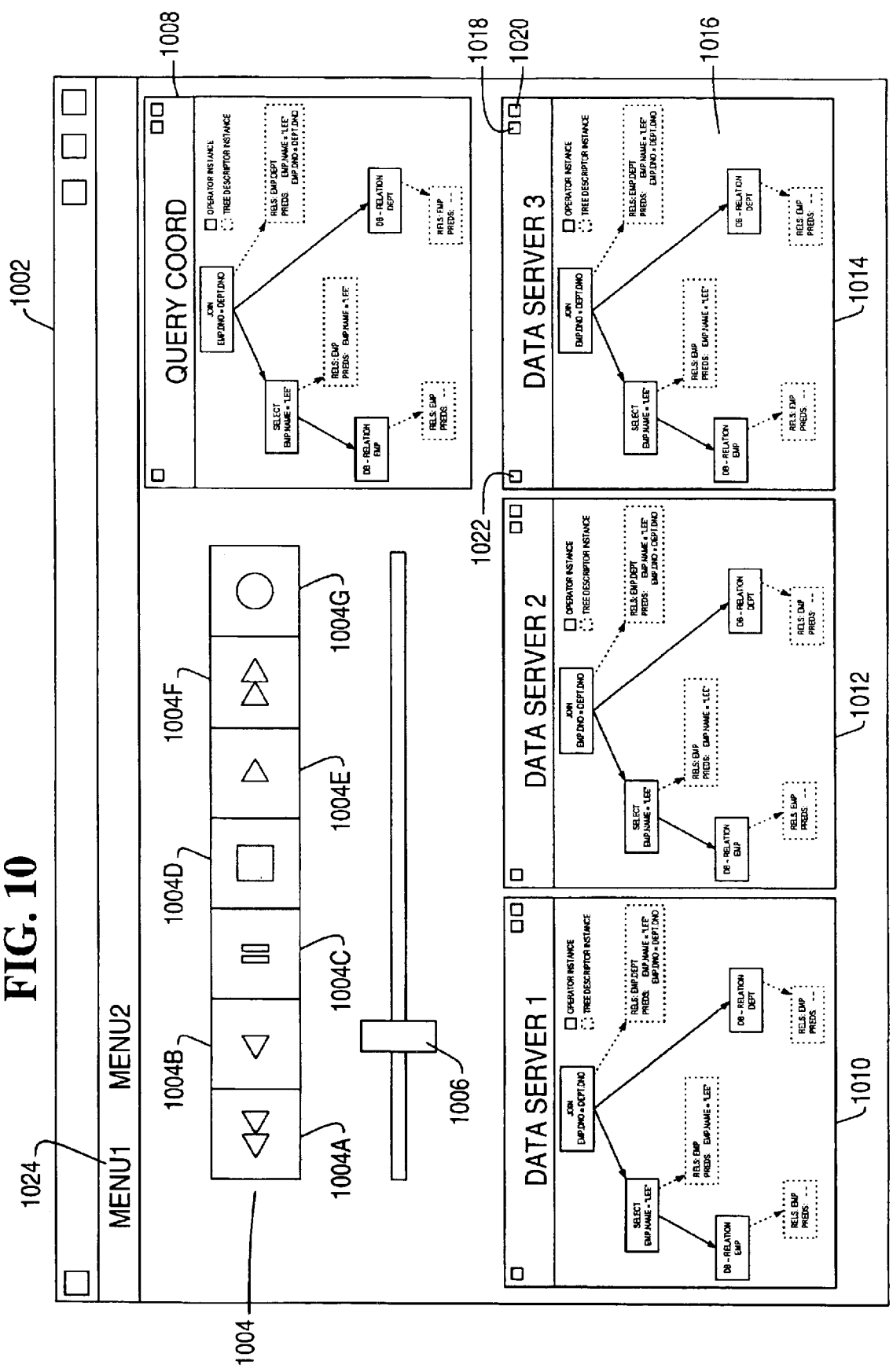
FIG. 10 is a diagram showing an illustrative embodiment of a user interface used for post-mortem analysis.

FIG. 10 is a diagram showing an illustrative embodiment of a user interface used for post-mortem analysis. Analysis results are presented in a window 1002, having a series of presentation command tools 1004, including a fast reverse play command tool 1004A, a reverse play command tool 1004B, a pause command tool 1004C, a stop command tool 1004D, a play command tool 1004E, a fast play command tool 1004F, and a recording command tool 1004G. The user can also fast forward, reverse, pause or stop playback using the scrollable bar 1006. Multiple correlated windows 1008–1012 show concurrent activities performed by the query coordinator 122 and the data server(s) 130A–130F. The user can select which data servers 130 present execution trace information, using drop-down menu elements 1024, and can control the size and presentation of the correlated windows 1008–1014. In one embodiment, the execution trace information is presented in the form of operator trees 1016. Other information, including time stamps can be provided as well.

Figure 11:
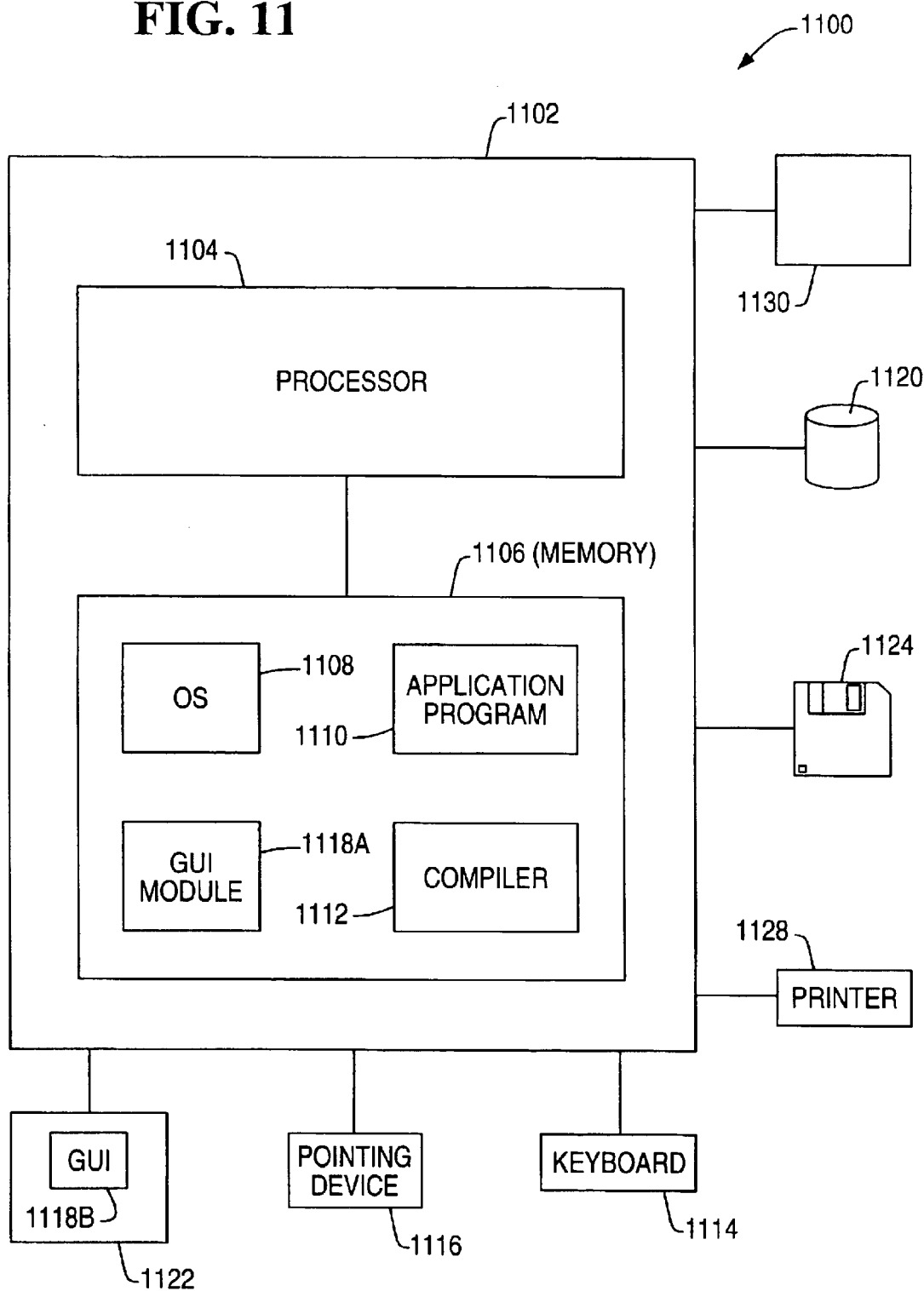
FIG. 11 is a diagram showing an exemplary computer system in which the present invention may be practiced.

FIG. 11 illustrates an exemplary computer system 1100 that could be used to implement the client process 102, query coordinator 104, or data server 130 of the present invention. The computer 1102 comprises a processor 1104 and a memory, such as random access memory (RAM) 1106. The computer 1102 is operatively coupled to a display 1122, which presents images such as windows to the user on a graphical user interface 1118B. The computer 1102 may be coupled to other devices, such as a keyboard 1114, a mouse device 1116, a printer, etc. Of course, those skilled in the art will recognize that any combination of the above components, or any number of different components, peripherals, and other devices, may be used with the computer 1102.

Generally, the computer 1102 operates under control of an operating system 1108 stored in the memory 1106, and interfaces with the user to accept inputs and commands and to present results through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors. The computer 1102 also implements a compiler 1112 which allows an application program 1110 written in a programming language such as COBOL, C++, FORTRAN, or other language to be translated into processor 1104 readable code. After completion, the application 1110 accesses and manipulates data stored in the memory 1106 of the computer 1102 using the relationships and logic that was generated using the compiler 1112. The computer also optionally comprises an external communication device such as a modem, satellite link, Ethernet card, or other devices for communicating with other computers.

In one embodiment, instructions implementing the operating system 108, the computer program 1110, and the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of instructions which, when read and executed by the computer 1102, cause the computer 1102 to perform the steps necessary to implement and/or use the present invention. Computer program 1110 and/or operating instructions may also be tangibly embodied in memory 1106 and/or data communications devices, thereby making a computer program product or article of manufacture according to the invention. As such, the terms "article of manufacture" and "computer program product," or "program storage device" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. In summary, the present invention describes a method, apparatus, and article of manufacture for monitoring an executed query.

The method comprises the steps of executing the query; and while executing the query, storing an execution trace record for each execution thread in at least one execution log file. The execution trace record comprises execution trace information including a thread ID and a time stamp for the execution thread. The execution trace information can be recalled from the execution log file and presented to a user after execution of the query to allow post mortem analysis of the query. The article of manufacture comprises a program storage device tangibly embodying instructions for performing the method steps described above.

The apparatus comprises a data server for executing the execution thread and for storing an execution trace record for the executed execution thread, the execution trace record having execution trace information including a thread identifier and a time stamp; a query coordinator, for storing an execution plan having a time stamp and for retrieving and synchronizing the execution trace record and the execution plan; and a client process for displaying the retrieved execution trace information to a user after execution of the query.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of monitoring an execution of a query performed by a database system having a query coordinator and at least one data server, wherein the query execution comprises at least one execution thread, the method comprising the steps of:

for each thread, generating first execution trace information in the query coordinator, wherein the first execution trace information comprises an execution plan in terms of one or more operator trees;

for each thread, generating second execution trace information in the data server; and wiring the first execution information and the second execution trace information to at least one execution log file.

2. The method of claim 1, wherein the first execution trace information further comprises operator dispatch information, operator start times and operator stop times.

3. The method of claim 1, wherein the second execution trace information includes a session identifier (ID) and a query ID.

4. The method of claim 3, wherein the second execution trace information further includes, for each operator:

an identifier (ID) for the operator;

a start time stamp; and a finish time stamp.

5. The method of claim 4, wherein the start time stamp and the finish time stamp reference a logical time.

6. The method of claim 4, wherein the start time stamp and the finish time stamp reference a clock time.

7. The method of claim 1, wherein the first execution trace information and the second execution trace information are written to a single file.

8. The method of claim 1, wherein the first execution trace information and the second trace information are written to different files.

9. The method of claim 1, further comprising the step of reconstructing the execution trace information from the log file.

10. The method of claim 1, further comprising the steps of:

accepting a presentation command;

reconstructing the execution trace information according to the thread ID, the time stamp and the presentation command; and presenting the reconstructed execution trace information.

11. The method of claim 1, wherein the steps of generating first execution trace information in the query coordinator and generating second execution trace information in the data server is performed while executing the query.

12. The method of claim 1, wherein the first execution trace information and the second execution trace information include a thread ID and a time stamp, and the method further comprises the step of:

synchronizing the execution trace records according to the time stamp.

13. An apparatus for monitoring an execution of a query performed by a database system having a query coordinator and at least one data server, wherein the query execution comprises at least one execution thread, the apparatus comprising:

means for generating first execution trace information for each thread in the query coordinator, wherein the first execution trace information comprises an execution plan in terms of one or more operator trees;

means for generating second execution trace information for each thread in the data server, and means for writing the first execution trace information and the second execution trace information to at least one execution log file.

14. The apparatus of claim 13, wherein the first execution trace information further comprises operator dispatch information, operator start times and operator stop times.

15. The apparatus of claim 13, wherein the second execution trace information includes a session identifier (ID) and a query ID.

16. The apparatus of claim 15, wherein the second execution trace information further includes, for each operator:

an identifier (ID) for the operator;

a start time stamp; and a finish time stamp.

17. The apparatus of claim 16, wherein the start time stamp and the finish time stamp reference a logical time.

18. The apparatus of claim 16, wherein the start time stamp and the finish time stamp reference a clock time.

19. The apparatus of claim 13, wherein the first execution trace information and the second execution trace information are written to a single file.

20. The apparatus of claim 13, wherein the first execution trace information and the second trace information are written to different files.

21. The apparatus of claim 13, further comprising means for reconstructing the execution trace information from the log file.

22. The apparatus of claim 13, further comprising:

means for accepting a presentation command;

means for reconstructing the execution trace information according to the thread ID, the time stamp and the presentation command; and means for presenting the reconstructed execution trace information.

23. The apparatus of claim 13, wherein first execution trace information is generated in the query coordinator and the second execution trace information is generated in the data server while the query is executed.

24. The apparatus of claim 13, wherein the first execution trace information and the second execution trace information include a thread ID and a time stamp, and the apparatus further comprises:

means for synchronizing the execution trace records to the time stamp.

25. A program storage device, readable by a computer, tangibly embodying at least one program of instructions executable by the computer to perform method steps of monitoring an execution of a query performed by a database system having a query coordinator and at least one data server, wherein the query execution comprises at least one execution thread, the method steps comprising the steps of:

for each thread, generating first execution trace information in the query coordinator, wherein the first execution trace information comprises an execution plan in terms of one or more operator trees;

for each thread, generating second execution trace information in the data server; and writing the first execution trace information and the second execution trace information to at least one execution log file.

26. The program storage device of claim 25, wherein the first execution trace information further comprises operator dispatch information, operator start times and operator stop times.

27. The program storage device of claim 25, wherein the second execution trace information includes a session identifier (ID) and a query ID.

28. The program storage device of claim 27, wherein the second execution trace information further includes, for each operator:
- an identifier (ID) for the operator;
- a start time stamp; and
- a finish time stamp.

29. The program storage device of claim 28, wherein the start time stamp and the finish time stamp reference a logical time.

30. The program storage device of claim 28, wherein the start time stamp and the finish time stamp reference a clock time.

31. The program storage device of claim 28, wherein the first execution trace information and the second execution trace information are written to a single file.

32. The program storage device of claim 28, wherein the first execution trace information and the second trace information are written to different files.

33. The program storage device of claim 28, further comprising the step of reconstructing the execution trace information from the log file.

34. The program storage device of claim 28, wherein the method steps further comprise the steps of:
- accepting a presentation command;
- reconstructing the execution trace information according to the thread ID, the time stamp and the presentation command; and
- presenting the reconstructed execution trace information.

35. The program storage device of claim 28, wherein the method steps of generating first execution trace information in the query coordinator and generating second execution trace information in the data server is performed while executing the query.

36. The program storage device of claim 28, wherein the first execution trace information and the second execution trace information include a thread ID and a time stamp, and the method steps further comprise the step of:
- synchronizing the execution trace records according to the time stamp.

* * * * *